No. 711,620. Patented Oct. 21, 1902.
W. H. ERMENTROUT & L. V. HALBERSTADT.
BEARING BOX FOR SHAFT HANGERS.
(Application filed June 18, 1902.)
(No Model.)

Witnesses
Florence Kelly
Katharine Kelly

William H. Ermentrout
Lewis V. Halberstadt
Inventors

By Attorney

UNITED STATES PATENT OFFICE.

WILLIAM H. ERMENTROUT AND LEWIS V. HALBERSTADT, OF READING, PENNSYLVANIA.

BEARING-BOX FOR SHAFT-HANGERS.

SPECIFICATION forming part of Letters Patent No. 711,620, dated October 21, 1902.

Application filed June 18, 1902. Serial No. 112,197. (No model.)

*To all whom it may concern:*

Be it known that we, WILLIAM H. ERMENTROUT and LEWIS V. HALBERSTADT, citizens of the United States, residing at Reading, in the county of Berks and State of Pennsylvania, have invented certain new and useful Improvements in Bearing-Boxes for Shaft-Hangers; and we do hereby declare the following to be a full, clear, and exact description of the invention, such as will enable others skilled in the art to which it appertains to make and use the same.

This invention relates to improvements in bearing-boxes for shaft-hangers; and the object of the invention is to facilitate the lubricating of the shaft-bearing therein.

The invention consists of the box to contain the lubricant and the bearing therein, with means for conveying the lubricant to the working face of said bearing, and it is in this means that the invention consists.

The invention is fully described in the following specification and clearly illustrated in the accompanying drawings, in which—

Figure 1:
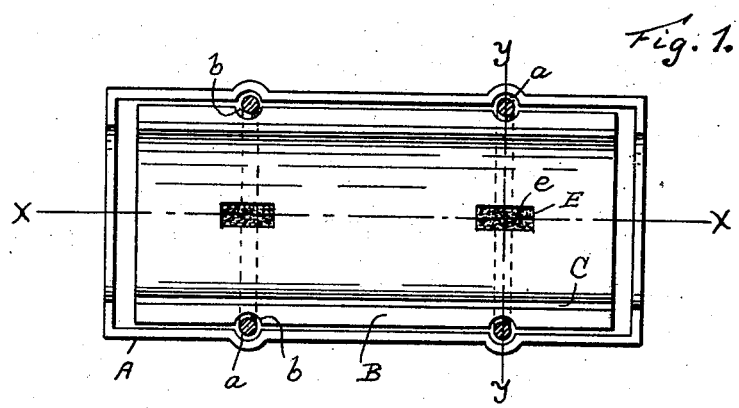
Figure 2:
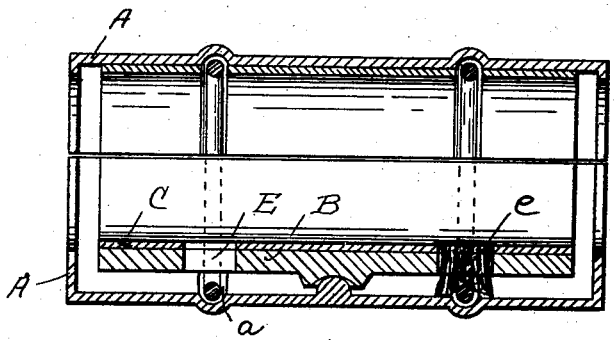
Figure 3:
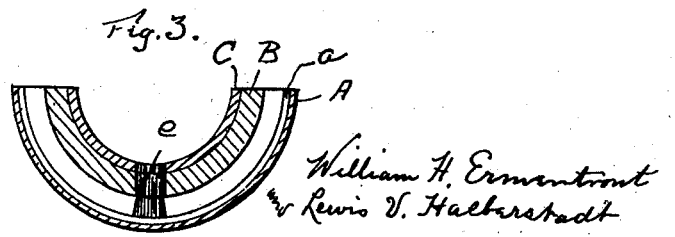

Figure 1 is a plan view of the box and bearing with the cover removed. Fig. 2 is a longitudinal sectional view taken on line $xx$, and Fig. 3 is a vertical sectional view taken on a line $yy$, of Fig. 1.

A is the box for casing and is of ordinary construction with two depressions or circumferential grooves $a$, formed in its inner face.

B is the bearing, and it is mounted on a central pivot in the base of said box. The outer wall of said bearing is formed with depressions or circumferential grooves $b$, similar to and registering with the grooves $a$ in the casing. This bearing B is provided with a lining C, preferably of soft metal. Two openings E are formed in both the bearing and the lining about an equal distance from either end, and in these openings are placed wicks $e$, of suitable conducting material, through which the lubricant may be carried from the bearing-box to the bearing-surface of the lining by means of capillary attraction. In the circumferential grooves around the bearing formed by the openings $a$ and $b$, are placed flexible rings capable of revolving thereon. These rings are prevented from longitudinal displacement by means of said registering grooves. Obviously we may employ chains or any other flexible rings, if desired; but in our drawings accompanying this application we have only illustrated the use of rings.

It will be seen that with our present construction either mode of conveying the lubricant to the bearing-point may be employed. If for any reason the use of the rings or chains is not satisfactory or if it should be desired to dispense with their use, then the wick alone may be employed on the same bearing, or vice versa. If, on the other hand, it is desired to produce an unusually free or voluminous flow of oil, both of the described means may be used at the same time and in the same bearing.

Having thus fully described the invention and its application, what we claim, and desire to procure by Letters Patent, is—

A bearing-box for shaft-hangers, comprising a sectional casing, said casing being provided with a plurality of internal circumferential grooves, a bearing mounted in said casing on a central pivot, and provided with a plurality of external circumferential grooves adapted to register with the grooves in the casing, said bearing also being provided with a plurality of apertures, in its base in proximity to the grooves, a lining in the base of the bearing, also provided with apertures, adapted to register with the apertures in the bearing, wicks secured in the registering apertures, and rings surrounding the bearing, said rings being held in position from longitudinal displacement by means of the registering circumferential grooves.

In testimony whereof we affix our signatures in presence of two witnesses.

WILLIAM H. ERMENTROUT.
LEWIS V. HALBERSTADT.

Witnesses:
GEO. M. MILLER,
ED. A. KELLY.